(12) United States Patent
Jessop et al.

(10) Patent No.: US 10,217,115 B2
(45) Date of Patent: Feb. 26, 2019

(54) APPARATUS, METHODS, AND ARTICLES OF MANUFACTURE FOR BUSINESS ANALYSIS

(75) Inventors: Thomas Jessop, New York, NY (US); Brian S. Brittingham, New York, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 2768 days.

(21) Appl. No.: 09/942,453

(22) Filed: Aug. 30, 2001

(65) Prior Publication Data
US 2003/0046095 A1 Mar. 6, 2003

(51) Int. Cl.
*G06Q 40/00* (2012.01)
*G06Q 30/02* (2012.01)

(52) U.S. Cl.
CPC ............ *G06Q 30/02* (2013.01); *G06Q 40/00* (2013.01)

(58) Field of Classification Search
USPC .................................. 705/35, 36 R, 36 T, 37
See application file for complete search history.

(56) References Cited

U.S. PATENT DOCUMENTS

| | | | | |
|---|---|---|---|---|
| 5,132,899 A | * | 7/1992 | Fox | 705/36 R |
| 5,701,453 A | * | 12/1997 | Maloney et al. | 707/2 |
| 6,078,904 A | * | 6/2000 | Rebane | 705/36 R |
| 6,112,188 A | * | 8/2000 | Hartnett | 705/36 R |
| 6,317,726 B1 | * | 11/2001 | O'Shaughnessy | 705/36 R |
| 6,721,713 B1 | * | 4/2004 | Guheen et al. | 705/1 |
| 7,027,051 B2 | * | 4/2006 | Alford et al. | 345/440 |
| 2001/0032029 A1 | * | 10/2001 | Kauffman | 700/99 |
| 2002/0059126 A1 | * | 5/2002 | Ricciardi | 705/36 |
| 2002/0158918 A1 | * | 10/2002 | Feibush et al. | 345/853 |

FOREIGN PATENT DOCUMENTS

WO    WO 01/42383 A2 * 6/2001 ............... C09G 5/36

OTHER PUBLICATIONS

Pacheco (Pacheco et al., Proceedings of IEEE 5th International Fuzzy Systems (vol. 2, pp. 1007-1012 vol. 2), "A hybrid intelligent system applied to financial statement analysis", Jan. 1, 1996).*

* cited by examiner

*Primary Examiner* — Gregory A Pollock

(57) ABSTRACT

The present invention comprises methods, apparatus and articles of manufacture for providing, analyzing and visualizing corporate and corporate relationship information, and for creating financial products and instruments based on corporate and corporate relationship information. Information types such as entities, relationships, selection, groupings, arrangements, view types are provided to enable the user to interactively review, modify and create information.

26 Claims, 13 Drawing Sheets

Pop up window with view also

WEB BROWSER

| Companies - Sector: | Fortune 1000 - Telecom | ▼ |

| Companies - Individual | TXCC | ▼ |

| Show Relationship: | Customer - Supplier | ▼ |

| GroupBy: | Industry Segment | ▼ |

| Levels: | 4 | ▼ |   | Arrangement: | Columns | ▼ |

| VIEW |   | ADD TO VIEW |   | SAVE VIEW |

*FIGURE 5*

APPARATUS, METHODS, AND ARTICLES OF MANUFACTURE FOR BUSINESS ANALYSIS

This invention relates to apparatus, methods, and articles of manufacture for business analysis. More particularly, this invention relates to apparatus, methods, and articles of manufacture for analyzing corporate information and corporate relationships.

BACKGROUND OF THE INVENTION

Information about a company, a company's competitors, suppliers, customers and the like is very helpful in understanding and analyzing that company. This information, which is described herein as a company's "corporate information," is sought by researchers, analysts, traders, and others.

Investigating corporate information is not easy, however. There are tools that permit investigation into information about company, but do not readily make available information about a company's competitors, suppliers, customers and the like ("corporate relationships.") Some limited corporate relationship tools do exist, however, those tools often concern themselves primarily with competitive relationships, also known as "horizontal" relationships. For example, an investor may be able to determine where a company ranks within its industry on a number of measures, such as outstanding debt, return on equity, etc. Moreover, the available tools use traditional industry or sector classification, which groups companies largely in terms of the similarity of their products or services. However, simply understanding these horizontal relationships, even within similar industries or sectors, does not provide other relationship information that may be at least as valuable. For example, information about suppliers and/or customers (also known as "vertical" relationships) might reveal useful information such as, for example, over much dependence on a single customer. There are few, if any tools permitting thus horizontal and vertical relationship or "value chain."

Moreover, corporate relationship information must be quickly accessed when considering investment decisions. Trading stocks, bonds, etc. requires rapid decision-making. Corporate relationship information, to be useful, must be available as soon as desired. Additionally, any such information must also be understandable, that is, presented in a way so as to help rapid assimilation and understanding of the information. (See e.g., Tufte, Edward, *Visual Explanations*: "When principles of design replicate principles of thought, the act of arranging information becomes an act of insight." 9, Graphics Press, 1997]

Even if corporate information and corporate relationship information tools exist, those tools do not adequately provide for rapid and useable information. For example, a financial institution might have reams of corporate information and corporate relationship information stored internally, in enterprise databases, as well as in other places, however, accessing and displaying such information may not be easily done, if at all. Moreover, once such information is accessed, it is usually available only in a static format, that is, in charts, graphs, and the like.

The general lack of availability, rapidity and understandability of corporate relationship information also limits creation of financial products. For example, presently financial products exist that divide industries into segments based on common business, such as telecommunications, semiconductors, etc. However, the financial markets constantly strive to create new financial products. If corporate relationship information was easily understandable and rapidly available, new financial products based on that information could be created, such as indexes, derivatives, etc.

Therefore, it is an object of the present invention to provide methods, apparatus, and articles of manufacture for providing corporate relationship information.

It is a further object of the present invention to provide methods, apparatus, and articles of manufacture for analyzing corporate and corporate relationship information.

It is a further object of the present invention to provide methods, apparatus, and articles of manufacture for visualizing corporate and corporate relationship information.

It is a further object of the present invention to provide methods, apparatus, and articles of manufacture for creating financial products based on corporate and corporate relationship information.

SUMMARY OF THE INVENTION

The present invention comprises methods, apparatus and articles of manufacture for providing, analyzing and visualizing corporate information and corporate relationship information. The present invention also comprises methods, apparatus and articles of manufacture for creating financial products based on corporate information and corporate relationship information.

In the preferred embodiments, the desired information comprises a number of information types, including entities, relationships, selection, groupings, arrangements, and view types. These information types are present on databases in other formats, and provided to the user through an interactive, graphic user interface. Elements of the interface provide user interaction through various input means, such as pointing devices, keyboards, etc. The user can dynamically alter a presented view, so that, for example, upon viewing a first company and its set of relationships, alter the view to display a second company and its relationships. Such dynamic alteration is preferably provided through a view of a first company node being connected to one or more other company nodes. A second company node can then be brought forward, and its connections shown in turn. Comparison tools between the two nodes can be provided as well.

The preferred embodiments additionally provide for the capturing of desired company information and company relationship information, so that financial products, financial instruments, analysis tools, etc. can be supplied to a user.

BRIEF DESCRIPTION OF THE DRAWINGS

FIG. 5 shows a representation of a preferred embodiment.

DETAILED DESCRIPTION OF THE PREFERRED EMBODIMENTS

Figure 1:
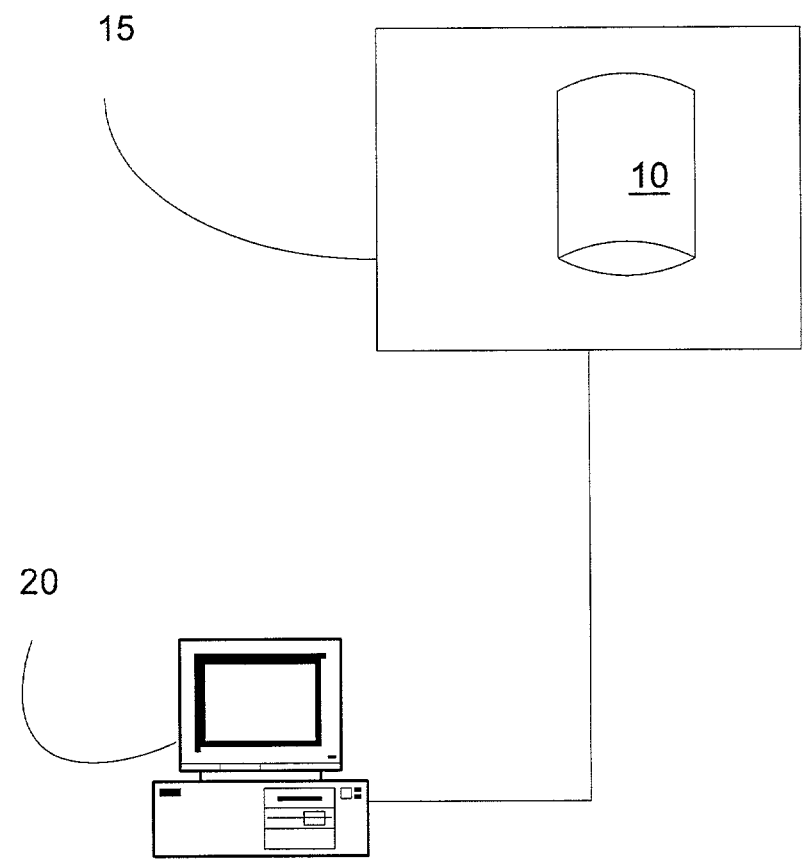
FIG. 1 shows a schematic view of a preferred embodiment.

FIG. 1 shows a schematic view of a preferred embodiment. Database 10 is housed on server 15. Database 10 is populated with information concerning various entities. Client 20 accesses the server 15 through any manner known in the art, retrieves desired information, and arranges and displays the desired information. Other preferred embodiments may arrange and display the desired information on the server side of the transaction. Additionally, yet other embodiments may be implemented in other than a client/server environment.

In the preferred embodiments, the desired information, being present on databases or other formats, is provided to the user through an interactive, graphic user interface. Elements of the interface provide user interaction through various input means, such as pointing devices, keyboards, etc.

Figure 2:
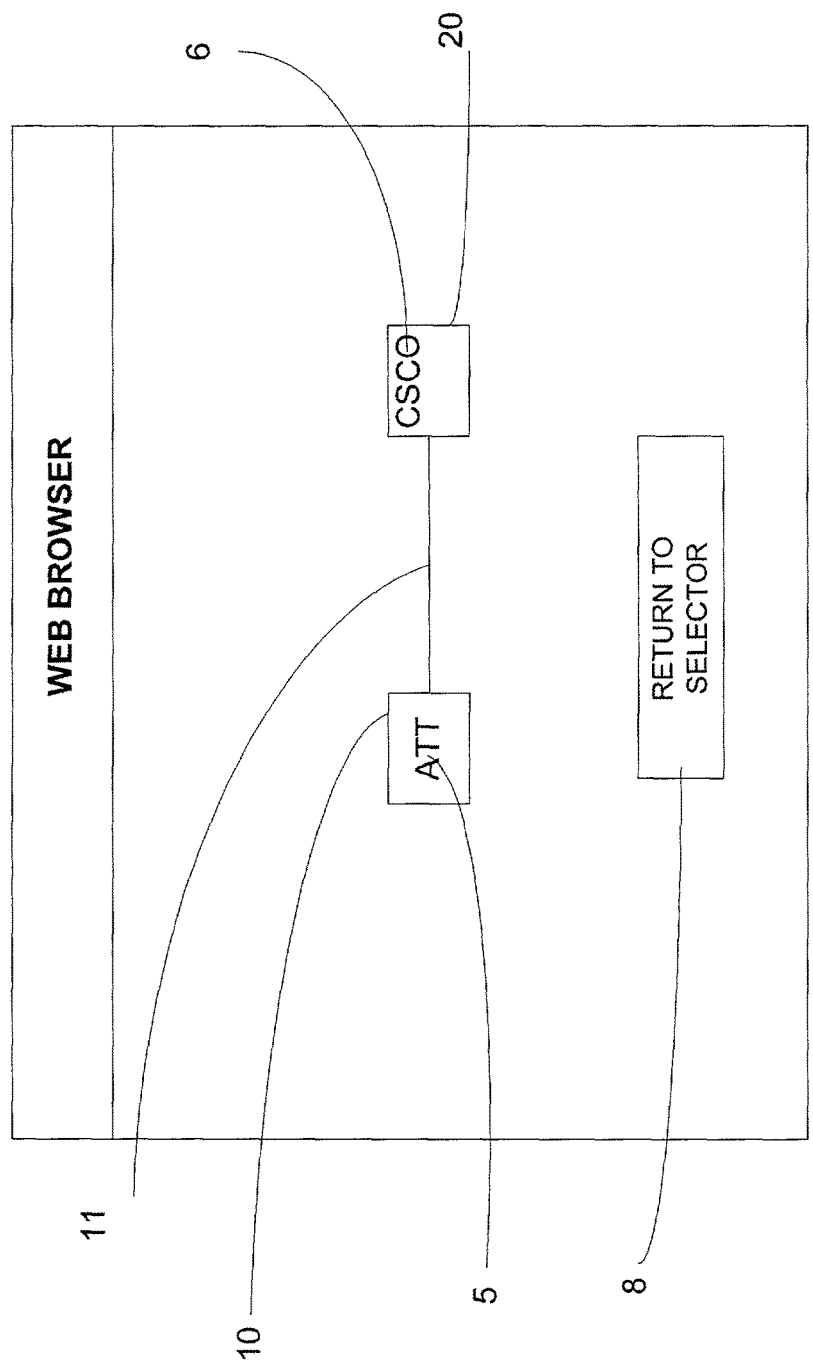
FIG. 2 shows a representation of a preferred embodiment.

In various preferred embodiments, there are various information types; entity information and entity relationships. Information about entities and entity relationships is shown in these embodiments. FIG. 2 shows an example of a display of a preferred embodiment, displayed in a Web browser window on a client system. The entities, corporations here, are represented by stock symbols within nodes, such as for example stock symbols 5 and 6 within nodes 10 and 20 respectively. Relationships between the entities, here customer-supplier relationships, are shown by lines connecting nodes, such as for example line 11 connecting node 10 and node 20. From the example, it can be seen that there is a customer-supplier relationship between the company represented by stock symbol 5 and node 10 and the company represented by stock symbol 6 and node 20. (It should be noted that stock symbols, corporations and relationships depicted in the examples set forth herein are wholly fictional and have no connection to any existing entities and are only used here for demonstrative purposes.)

Figure 3:
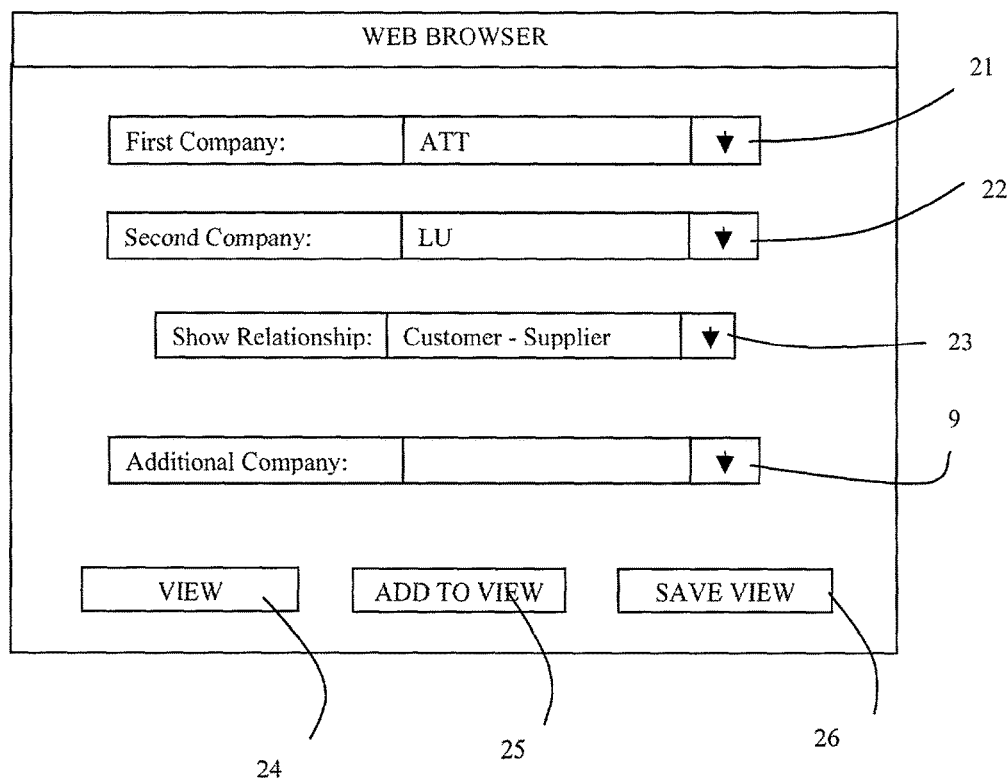
FIG. 3 shows a representation of a preferred embodiment.

The corporations and types of relationships shown in the example of FIG. 2 are selected by the user through a screen or screens on her client system. FIG. 3 shows an example of the screen used in a preferred embodiment to select specific corporate entity and entity relationship information. The user selects companies through typing in a selection box or using a drop-down menu. In this embodiment the user is restricted to information present on the server and cannot modify, add or delete information. Creation, modification, addition or deletion of information is done at the server as desired. In other embodiments, entity selection and relationship information may be present on either client, server or both, or in other configurations on other systems. In those embodiments, the user may have the ability to create, modify, add or delete entity and relationship information.

Returning now to the embodiment of FIG. 3, the user selects a first and second company through buttons 21 and 22 respectively, selects a relationship through button 23 and clicks View 24. A view type will then be generated, as for example the view shown in FIG. 2.

Figure 4:
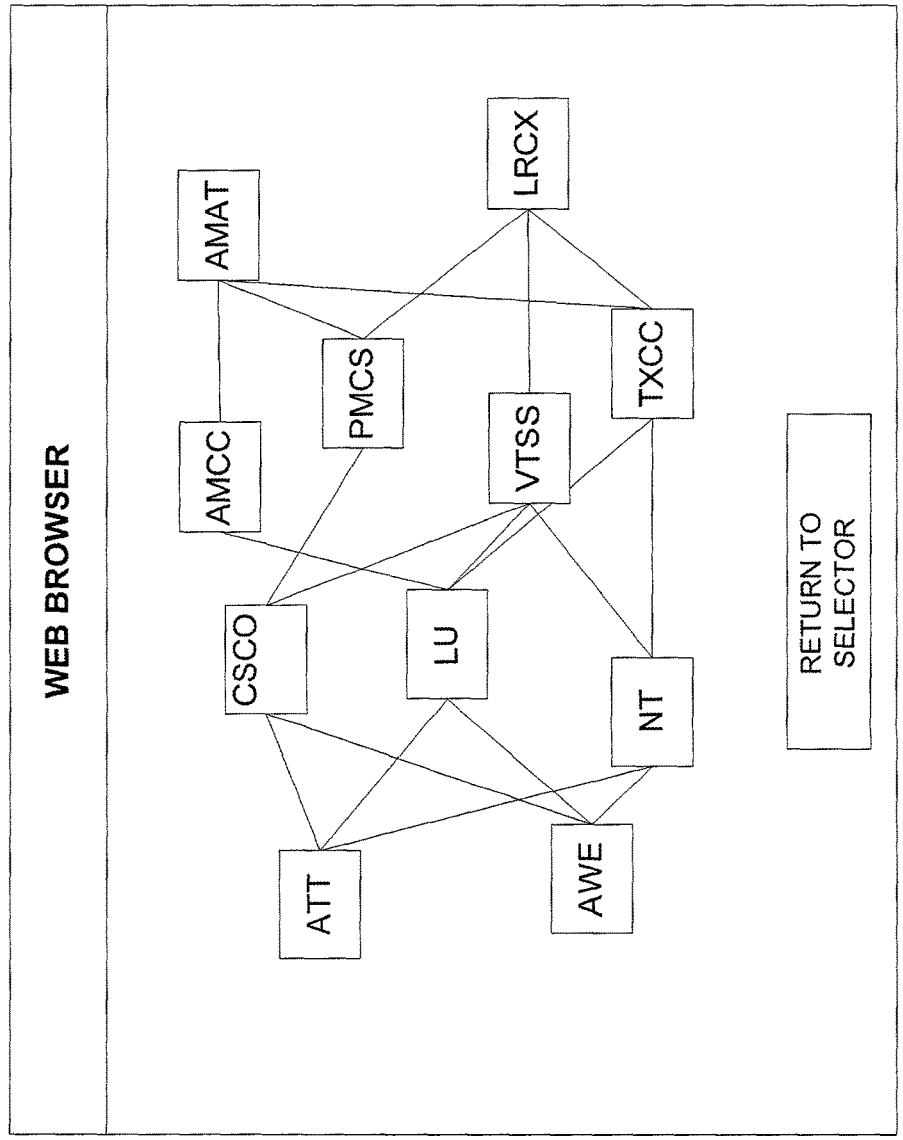
FIG. 4 shows a representation of a preferred embodiment.

Also seen in FIG. 2 is Return to Selector button 8. This button, upon activation by the user, such as through clicking on a mouse, returns the user to the screen shown in FIG. 3, and so permits the user, as desired, to alter the view. This alteration is accomplished by adding further companies by use of the Additional Companies selector box 9 and add to View 25. The user can then create a view with a number of companies and their relationships, such as shown for example in FIG. 4, as well as save his view by way of button 26 in FIG. 3.

Additional information types available in the preferred embodiments comprise: selection, grouping, arrangement and view.

Selection is the information type used to provide entities and entity information. FIG. 5 shows an example of the screen used in a preferred embodiment to select specific corporate entity and entity relationship information. The user may select entities and entities relationships by predetermined criteria, in this example, membership in a particular company sector.

Grouping is the information type used to establish the selected entities in one or more groups. For example, the user may also group the entities by industry segment in a number of levels. In this example, choosing four levels of industry segment would result in the example Largest 1000 Telecom group of entities being segmented into: 1) Telecom Service Providers, 2) Router and Switch Manufacturers, 3) Router and Switch Component Manufacturers, and 4) Router and Switch Component Machine Manufacturers.

Arrangement is the information type used to place the entities and entity relationships on the display. In the example of FIG. 5, a column arrangement is selected.

View is the result of selection of various other information types. In the preferred embodiments, predetermined view types are available, as is described further below.

Figure 6:
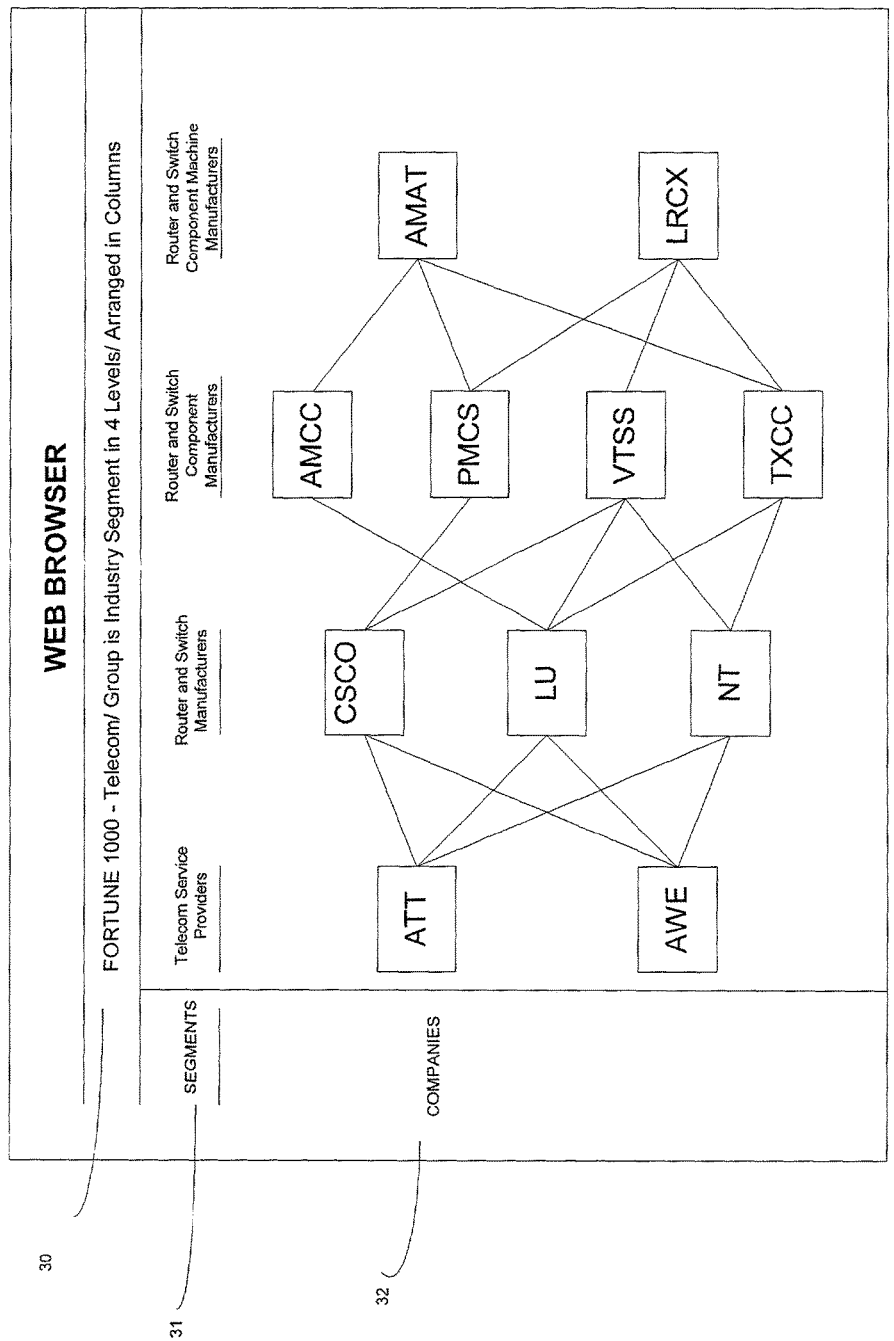
FIG. 6 shows a representation of a preferred embodiment.

FIG. 6 shows the result of the example selections in FIG. 5. The value chain of the Figure provides both horizontal and vertical relationships. The identification box 30 shows the selections made. The segment identification area 31 shows the various segments, and the company area 32 shows the various companies and their relationships. Of course, it may be possible that a vertical relationship, such as a customer-supplier relationship or another type of vertical relationship may extend among industry segments in the manner shown in FIG. 7. In that Figure, the Telecom Service Providers also have a customer-supplier relationship with the Router and Switch Component Manufacturers, and the Router and Switch Component Machine Manufacturers entities as shown.

Various indicia are used in some preferred embodiments to convey information about the information types.

Figure 7:
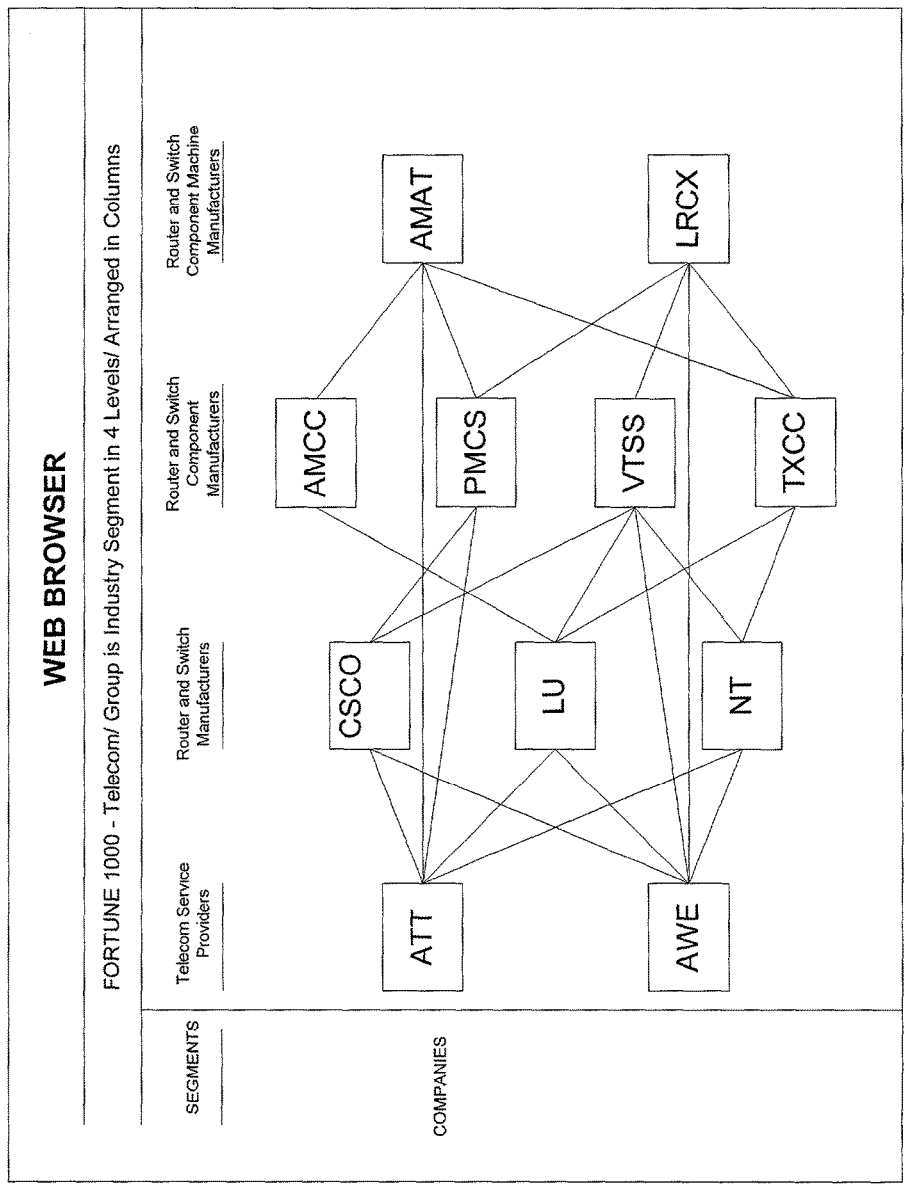
FIG. 7 shows a representation of a preferred embodiment.
Figure 8:
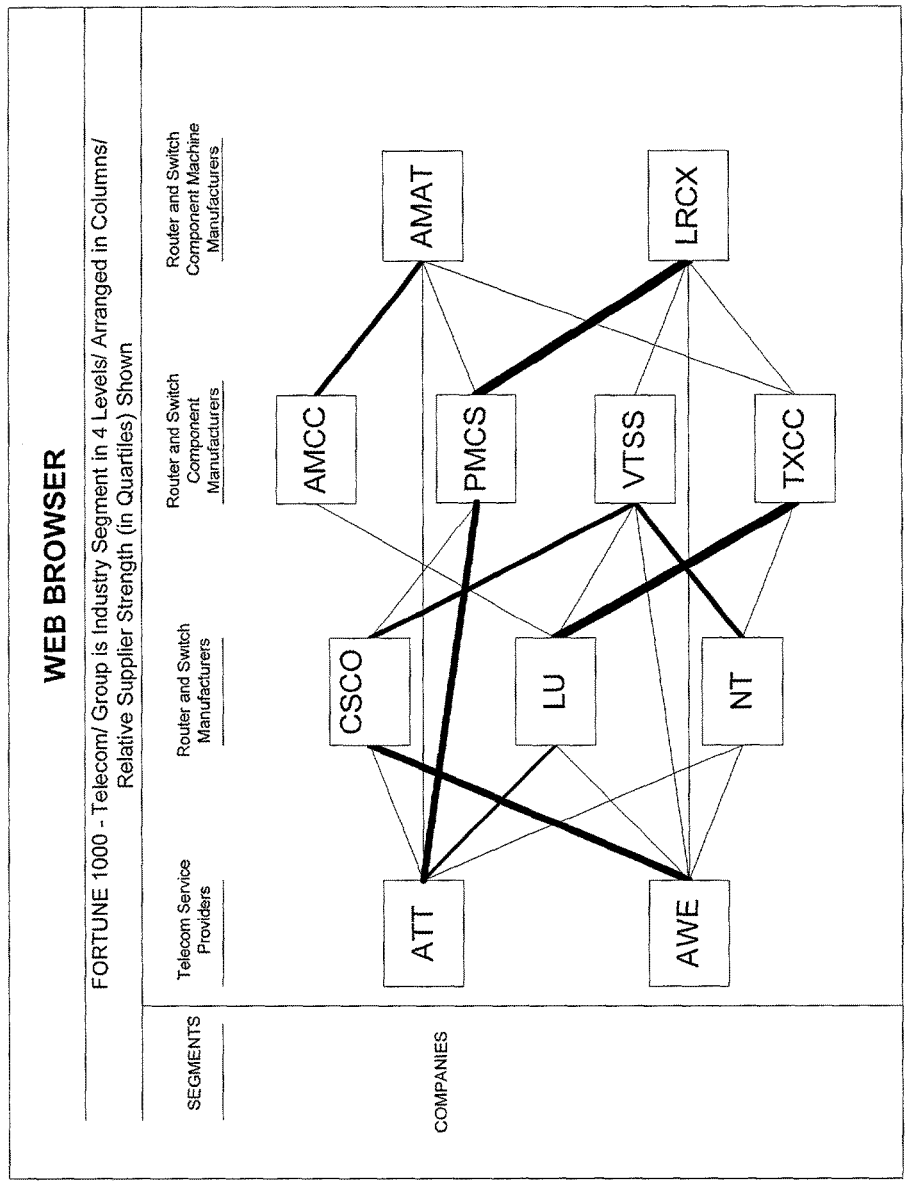
FIG. 8 shows a representation of a preferred embodiment.

For example, FIG. 8 shows an example, similar to FIG. 7, of indicia being used to convey information about the entity relationships. In the Figure, the respective percentage of supplier is indicated by the line thickness—the thicker the line the greater the percentage.

More than one relationship may be shown. For example, FIG. 7 shows customer-supplier relationships (solid line) and ownership relationships (dotted line) between a set of entities. The strength of the customer-supplier relationships is shown by graduated line thicknesses. The percent of ownership is shown by graduated line thicknesses as well. In the example of the Figure shared multiple relationships are shown by two lines, dotted and dashed, extending to the same company nodes, however, in other embodiments multiple relationships may be shown by other schemes including differing color lines, overlapping lines, other shapes, flashing shapes, etc.

Figure 9:
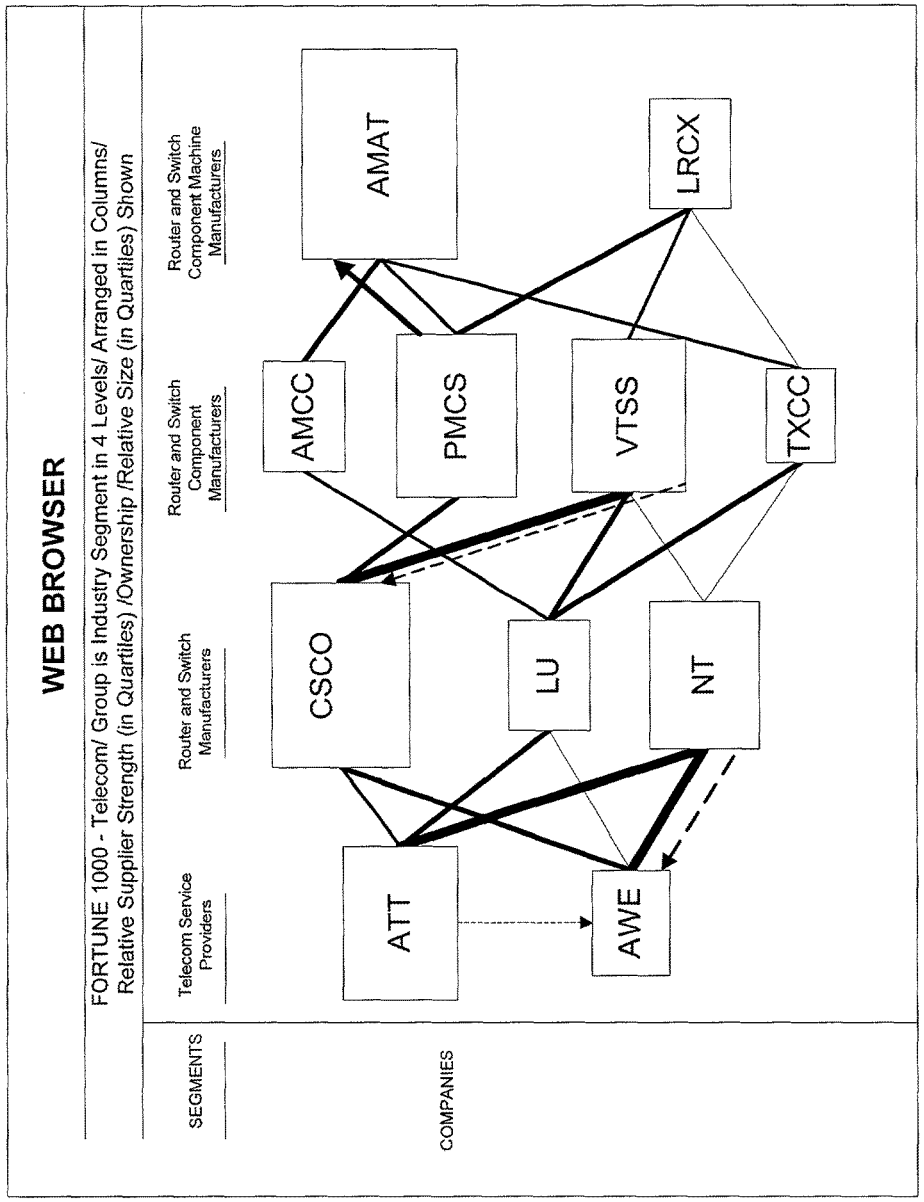
FIG. 9 shows a representation of a preferred embodiment.

Line thicknesses are not the only indicia possible. Any indicia known in the art, including but not limited to graphic indicia such as color, pattern, shape, as well as other indicia such as audio, video, etc., may be used to convey information in various preferred embodiments. For example, entity information, specifically, relative market size of each company is indicated by size of company node, in FIG. 9. FIG. 9 also shows further relationship information, specifically, ownership by one entity of another through the dotted lines with the arrow indicating the subsidiary company. In the example of the Figure shared multiple relationships are shown by two lines, dotted and dashed, extending to the same company nodes, however, in other embodiments multiple relationships may be shown by other indicia including but not limited to differing color lines, overlapping lines, other shapes, flashing shapes, etc. Preferred embodiments may use, as well, commercially available data visualization tools such as THEBRAIN™, THINKMAP™, etc.

Figure 10:
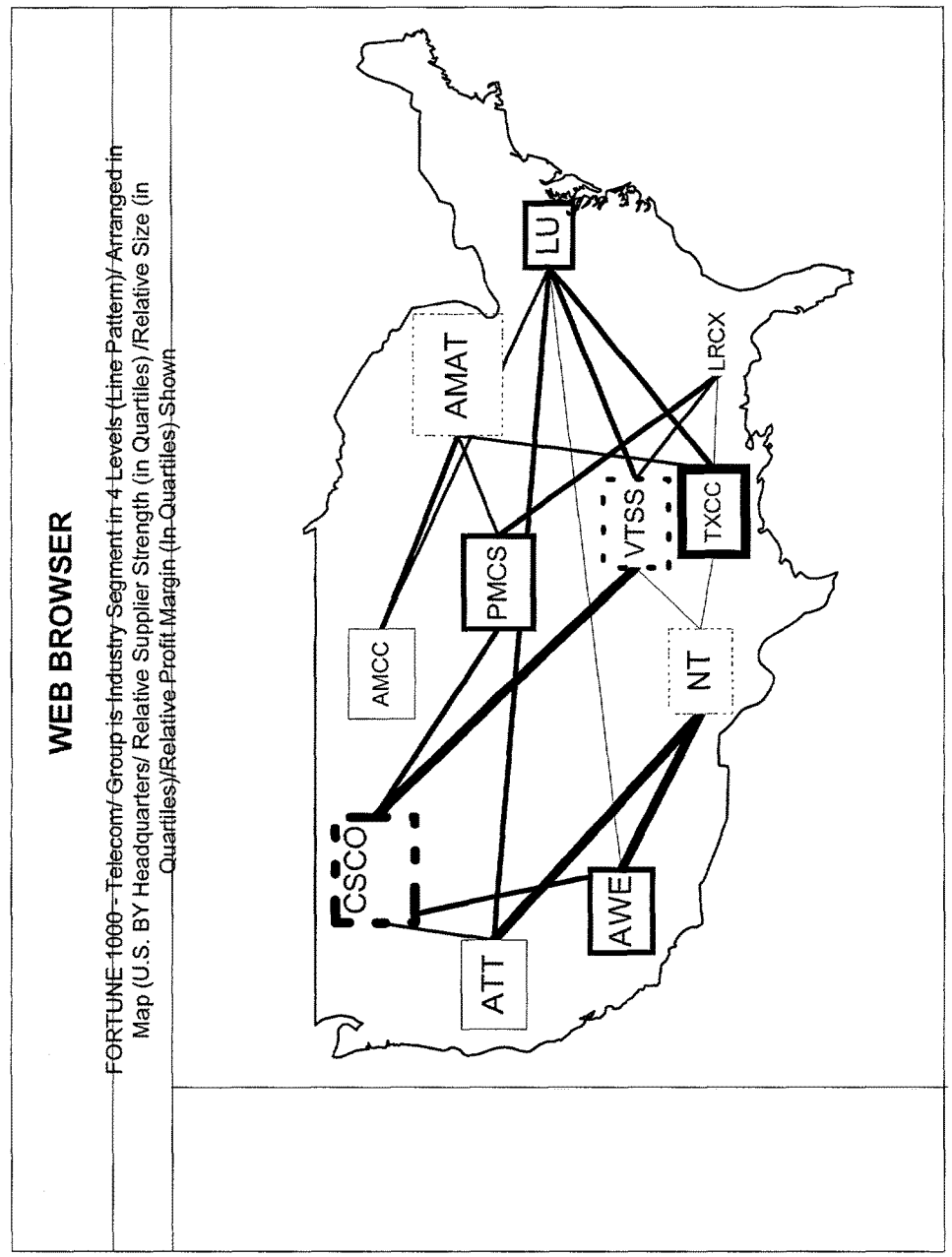
FIG. 10 shows a representation of a preferred embodiment.

FIG. 10 is yet another example of indicia being used to convey information. FIG. 10 shows a number of entities, with the company node reflecting size of the company, the thickness of the line of the node reflecting net profit margin, grouped by industry segment, shown by the line patterns of the node, in a map arrangement, with the strength of customer-supplier relationships shown by connecting line thicknesses.

Also, in some embodiments, additional information is displayed by using animated displays, drop down menus or other display technologies known in the art, such as for example when a user clicks on a company node, relationship or other information type or positions the cursor in a certain area of the screen. This additional information may be configured as desired, such as tables with further information, news and event information, latest stock prices, multimedia with the latest corporate news, etc.

Some preferred embodiments may as well provide various other views. For example, three-dimensional views might also be used to represent information, two two-dimensional views might be overlaid on top of each other to discover common companies, other multiple dimensions might be used as desired, etc. In general any view or views known in the art may be provided in preferred embodiments, as well as an option or options to change a view or views as desired. Additionally, in certain embodiments, a user could mark, note or otherwise alter the entities, relationships and other objects in a view.

Figure 11:
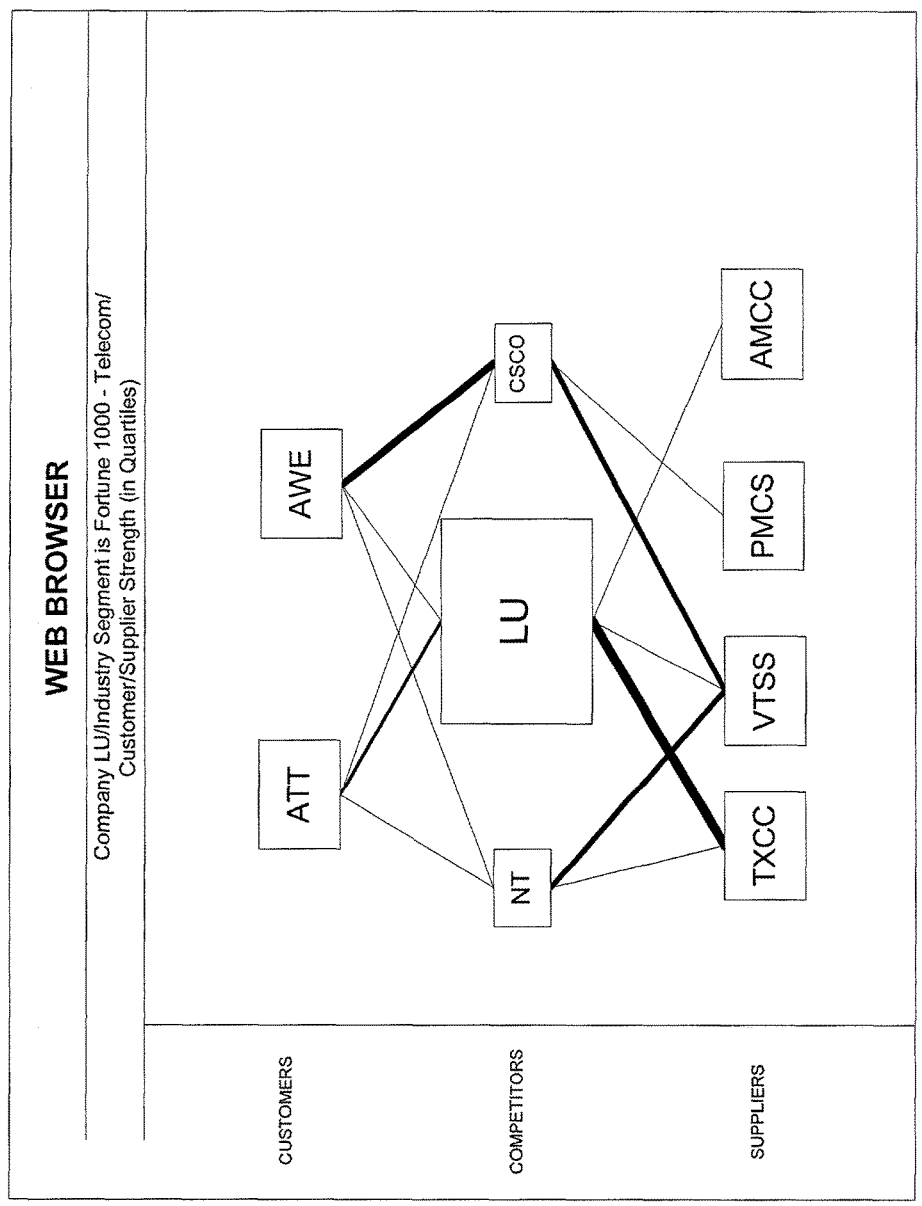
FIG. 11 shows a representation of a preferred embodiment.
Figure 12:
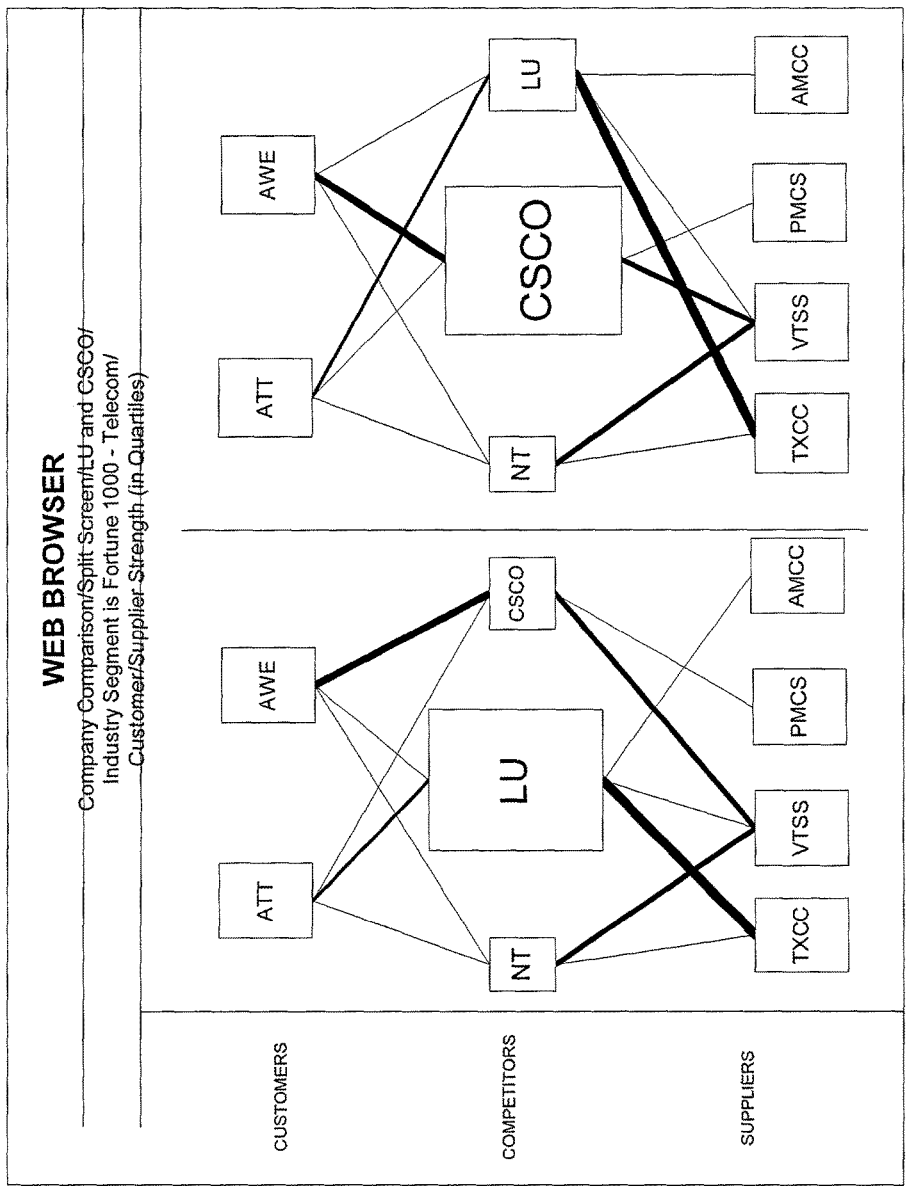
FIG. 12 shows a representation of a preferred embodiment.

Multidimensional views may be especially useful in those embodiments that group companies by criteria other than sector or products. For example, various embodiments permit grouping companies by dependencies on specific suppliers, clients or client segments, etc. Taking FIG. 8 as an example view, the user is able to "drill down" (by clicking on LU or using other method as known in the art) through any particular entity to view that entity's relationships in a different dimension. FIG. 11 shows the result of a drilling down to the entity identified as LU. The vertical customer-supplier relationships are present as are the horizontal competitors. If another competitor such as CSCO is viewed as well, a split screen view such as FIG. 12 will permit the user to quickly view the different relationships of the companies.

Note that the preferred embodiments provide various means for altering the views provided. Altering the view presented, so that, for example, upon viewing a first company and its set of relationships, and then providing the user with means to display a second company and its relationships through pointing device input, keyboard input, voice input, etc., (such as the example described immediately above with regard to FIGS. 8 and 11) is provided in the preferred embodiments. This alteration is dynamic—the user can determine as she is viewing one view that she wishes to view another company as well, such as in a split screen, or in successive screens. Thus, for example as had been described above, such dynamic alteration is preferably provided through a view of a foreground comprising a first company node connected to one or more other background company nodes. A second company node, of one of the background company nodes, can then be brought forward, and its connections shown in turn in the foreground, while the first node retreats to the background, becoming one of the background company nodes of the new, foreground company.

In especially preferred embodiments, a user is able to view sufficient entities and relationships to view dominant critical path dependencies, that is, each of the largest or dominant companies in their respective sectors, as well as the links between the companies. By linking market share leaders at each level of a view the balance of dominance across a group of related companies could be viewed. If for example, AMAT is the dominant Router and Switch Component Machine Manufacturer to AMCC, which is the dominant provider of Router and Switch Components to CSCO, which is the dominant Router and Switch Manufacturer to ATT, the dominant Telecom Service Provider, a dominant critical path among Largest 1000—Telecom could thus be identified.

The especially preferred embodiments permit critical path identification as desired. For example, correlation in stock price movements between companies might be identified, companies trading at similar valuations, etc. ("Critical path" is used herein to mean a pattern or patterns.) Moreover, once a desired critical path identification exists, a financial product, (e.g. a market basket of stocks making up the path) could be established and traded. It should be noted that various embodiments permit creation of market baskets based on any desired criteria, such as particular relationships, groupings, arrangements, etc.

A primary information type used to establish critical paths in the preferred embodiments is the view type. In the above examples that showed customer-supplier relationships the view type could be understood as a fundamental view type, that is, a view of fundamental information. Fundamental information as used herein comprises company, industry, and economic information and/or data (either public or proprietary) that allow for statistical and/or ratio analysis.

The preferred embodiments additionally may construct views of Market Risk information and/or Performance information. Market Risk information as used herein comprises information and/or data that considers volatility in individual entity and/or market price and fundamentals performance that broader entity and/or market fluctuations might induce due to exogenous events and/or data with broader relevance. Performance Information as used herein comprises information and/or data that includes but is not limited to statistical analysis of Fundamental and/or Market Risk data.

Types of fundamental information used in the views of the preferred embodiments include but are not limited to:

Revenue dependence of a company on a customer or customers. The amount or percentage of revenue that a company receives from any particular customer indicates degree of dependence on that customer. For example, a company may have one customer providing 90% of its revenue—that company is highly dependent on that major customer. An example of a useful revenue dependence view type would be a view that only shows companies with a high revenue dependence (i.e., small number of major customers).

Component or material dependence of a company on a supplier or suppliers. The amount or percentage of components or material that a company receives from a supplier indicates the degree of dependence on that supplier.

Business or political relationships between companies. Business or political relationships between companies may include any type of ties, e.g., company officers on the boards of other companies, family members in two companies, joint ventures, etc.

Strength of relationship between companies. Strength of relationship between companies may include variables such as length of time two companies have done business together, common stock ownership, etc.

The preferred embodiments use other types of information to construct other view types as well including but not limited to Market Risk view types, comprised of Market Risk information, and Performance view types comprised of Performance information.

Market Risk Information includes but is not limited to:

Correlation Coefficient Pricing Information. Correlation coefficient pricing information comprises current and historical correlation of stock prices between two companies or between a company and an index.

Relative Strength. Relative strength usually compares one company's stock price against one or more others, and/or against a sub-industry or sub-industries, an industry or industries, index or indicies, and/or market or markets.

Relative Strength Index (RSI). RSI comprises an absolute price momentum indicator. RSI calculates a security's closing price as against past closing performance, by taking the average of the closes of the up bars (the up frequency intervals) and dividing them by the average of the closes of the down bars. RSI ranges between 0 and 100, and may indicate an "overbought" condition when it is above 80 and an "oversold" condition when it is below 20. However, the buy and sell level may vary depending on the amount of bars used in the calculation. A shorter span of bars—or shorter time frame—may result in a more volatile indicator with greater extremes. A longer amount of bars—or time frame—may result in a less volatile reading with lesser extremes. Insofar as RSI is an absolute indicator, i.e. it indicates a company's performance against itself, comparisons are not usually made. However, in some embodiments, RSI could be used to compare a company against one or more other companies, and/or against a sub-industry or sub-industries, an industry or industries, index or indicies, and/or market or markets.

Relative Volatility. Relative volatility usually compares one company's stock volatility against one or more others, and/or against a sub-industry or sub-industries, an industry or industries, index or indicies, and/or market or markets.

Institutional Money Flow. Financial institutional money flow in or out of a company's stock.

Event Risk. Event risk information can be qualitative information such as earnings preannouncements, insider transactions, stock splits, announced mergers/acquisitions, etc.

Performance information includes but is not limited to:

Relative earnings growth. The earning growth percentage of a stock relative to some other stock or index.

N-period price performance. N-period price performance is the change in stock price over N-time periods compared to other stocks or indexes.

Earnings estimates. Earnings estimates of a company.

Earnings surprises. Earnings surprises information, including historical information.

Of course, embodiments may use any information to construct any type of view type desired, including but not limited to other types of Fundamental, Market Risk and Performance information. View types assist in analyzing other information types such as entities and relationships, and show the results of using information types such as selection, grouping, and arranging. Any view may comprise a view type.

In various embodiments, information types (e.g. entities, relationships, selection, groupings, arrangements, view types) are "pre-identified," that is, the user selects from a menu or other method known in the art desired entities and relationships stored on an internal server or server. In other embodiments, the user may identify information types that may or may not be stored on an internal server or servers. In certain of these types of embodiments, the system may also, after checking an internal server or servers, retrieve information about the desired information types from external sources and present it to the user. Depending on the nature of the information retrieved, the system may well be able to construct the relationships dynamically. Otherwise, the external data may need interpretation before being available to the user. Retrieved information may be stored internally as well. In some preferred embodiments, the information may be regularly updated, automatically and/or manually, from public and/or private sources.

Figure 13:
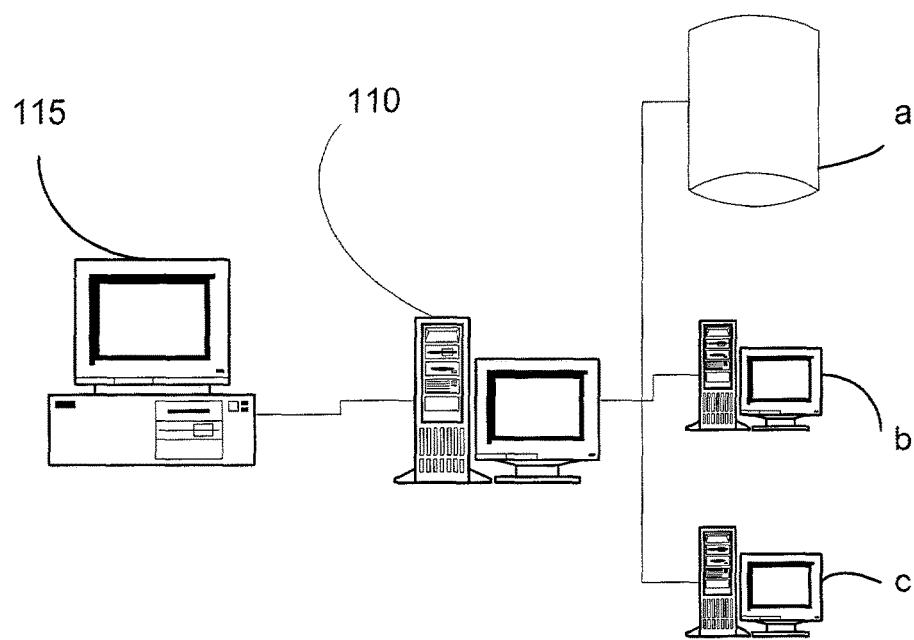
FIG. 13 shows a schematic view of a preferred embodiment.

Other embodiments use "on the fly" translation of information. For example, turning to FIG. 13, various information resources a, b and c are shown generally. User at terminal 115 requests relationship information through a connection to Server 110. Server 110 draws the relationship information sought by user 115 from sources a, b and c, translates the information if necessary, and thus constructs on-the-fly relationship information.

In the preferred embodiments, user access is through a Web browser or similar display, however, other displays or interfaces known in the art may be used as well, including dedicated displays or interfaces, multimedia interfaces, etc. Additionally, in various embodiments, access devices known in the art may be used, including but not limited to personal computers, terminals, limited access devices such as personal digital assistants, etc., with connections through wired or wireless means as known in the art.

Entities may be selected in a number of ways. As described above, for example, industry groupings may be used with the levels determined by industry segment. In another example, a first company or set of companies is selected from companies in the information repository. Then a second company or set of companies may be selected based on one or more criteria, for example a second company or set of companies may be selected that have relationships with the first company or set of companies. A third company or set of companies may similarly be selected, etc.

In various embodiments entities may include but are not limited to corporate entities and information, government entities and information, financial entities and information (including but not limited to industry, industry segment, sector, stock index or other indicies, etc.,) personal entities and information, and other types of desired things and information. Relationships may include but are not limited to: buyer-seller relationships, customer-supplier relationships; company-client relationships, parent company-subsidiary relationships, ownership relationships; resource sharing relationships; joint ventures; political/business relationships, competitor relationships, value chain relationships, horizontal and vertical relationships and other types of desired things and information.

Preferred embodiments of the invention comprise methods for constructing financial products. These embodiments utilize the various information types in constructing their products. For example, an embodiment constructs a group of stocks or other financial instruments for trading by utilizing the dominant companies in a particular sector (a "structured product,") such as, for example, common companies in the Largest 1000 telecom sector. As another example, embodiments might define indexes. For example, an index might be constructed containing all companies in the Largest 1000 telecom sector, including 1) Telecom Service Providers, 2) Router and Switch Manufacturers, 3) Router and Switch Component Manufacturers, and 4) Router and Switch Component Machine Manufacturers. The index might be weighted by each company's business line percentage or other variable, or be unweighted. Other financial products (e.g. mutual funds) may be constructed as desired as well.

Other preferred embodiments construct financial instruments. For example, structured trades, which comprise one or more stocks or other financial instruments for trading in a desired manner, might be constructed through various embodiments. For example, a structured trade may seek to capture the difference in volatility between two similar companies by selling calls with high volatility (more expensive=higher premium) and buying them with lower volatility (cheaper). As another example, a structured trade might be designed to provide exposure to the stock of company A while minimizing risk associated with a slowdown in orders from a company B, one of A's largest customers. The user would construct a pair trade through being long on A and short on B. The amount of the shorting would be weighted according to one or more desired criteria, such as A's percentage revenue exposure to B, i.e., factoring the dependency of A on it's supplier B. Other preferred embodiments might construct other financial instruments as desired.

The above description and material depicted by the figures are for purposes of illustration only and are not intended to be and should not be construed as limitations on the invention.

Moreover, certain modifications or alternatives may suggest themselves to those skilled in the art upon reading of this specification, all of which are intended to be within the spirit and scope of the present invention as defined in the attached claims.

We claim:

1. A processor-implemented method comprising:
   selecting, by a processor, a first corporate entity information type that defines a first corporate entity;
   selecting, by the processor, a second corporate entity information type that defines a second corporate entity;
   selecting, by the processor, a corporate entity relationship information type that defines a relationship between the first and second corporate entity information types;
   analyzing, by the processor, the selected corporate entity relationship information type;
   displaying, on a display based on the analysis, the first and second corporate entity information types and the corporate entity relationship information type in a graphical user interface view with predetermined indicia, the indicia graphically providing an indication of a connection between the first and second corporate entity information types and a strength of the relationship between the first and second corporate entity information types, and where the graphical user interface view includes a first company node representing the first corporate entity and a second company node representing the second corporate entity with the first company node reflecting a size of the first corporate entity and the second company node reflecting a size of the second corporate entity;
   providing, by the processor, an alteration mechanism, where the alteration mechanism dynamically changes an information type representing information to be displayed in the graphical user interface view, where the information type is chosen from a group comprising corporate entity type, corporate entity relationship type, selection type, grouping type, arrangement type, and view type;
   dynamically analyzing by the processor in coordination with the alteration mechanism, selected information types;
   dynamically changing, by the processor using the alteration mechanism, a displayed information type to a newly chosen information type;
   simultaneously displaying, on the display based on the dynamic analysis, the newly chosen information type associated with the first corporate entity information type and the second corporate entity information type, each displayed in separate display panels of the graphical user interface view, where the separate display panels facilitate a comparison regarding the first and second corporate entity information types;
   generating, by the processor, at least one critical path dependency pattern between the first and second corporate entity information types based on the comparison and the dynamic analysis; and
   constructing, by the processor, a financial product based on the selected and displayed information types and the generated at least one critical path dependency pattern.

2. The method as in claim 1, where the corporate entity type is comprised of predetermined criteria.

3. The method as in claim 2, where the corporate entity type is chosen from a group comprising corporate entities and corporate information.

4. The method as in claim 1, where the corporate entity relationship type is comprised of predetermined criteria.

5. The method as in claim 4, where the corporate entity relationship type is chosen from a group comprising buyer-seller relationships, customer-supplier relationships, company-client relationships, parent company-subsidiary relationships, ownership relationships, resource sharing relationships, joint ventures, political relationships, business relationships, competitor relationships, value chain relationships, horizontal relationships, and vertical relationships.

6. The method as in claim 1, where the selection type is comprised of predetermined criteria.

7. The method as in claim 6, where the selection type is chosen from a group comprising stocks, bonds, financial instruments, sectors, industry segments, standard industrial classification codes, and product lines.

8. The method as in claim 1, where the grouping type is comprised of predetermined criteria.

9. The method as in claim 8, where the grouping type is chosen from a group comprising stocks, bonds, financial instruments, sectors, industry segments, standard industrial classification codes, and product lines.

10. The method as in claim 1, where the arrangement type is comprised of predetermined criteria.

11. The method as in claim 10, where the arrangement type is chosen from a group comprising column, row, grid, map, free-form, and structured.

12. The method as in claim 1, where the view type is comprised of predetermined criteria.

13. The method as in claim 12, where the view type is chosen from a group comprising market information, risk information, and performance information.

14. The method as in claim 1, where the indicia further comprises corporate entity indicia and corporate entity relationship indicia.

15. The method as in claim 14, where the corporate entity indicia is chosen from a group comprising graphic indicia, audio indicia, and video indicia.

16. The method as in claim 15, where the graphic indicia is chosen from a group comprising color indicia, pattern indicia, and shape indicia.

17. The method as in claim 14, where the corporate entity relationship indicia is chosen from a group comprising graphic indicia, audio indicia, and video indicia.

18. The method as in claim 17, where the corporate entity relationship indicia is chosen from a group comprising color indicia, pattern indicia, and shape indicia.

19. The method as in claim 1, where the alteration mechanism is chosen from a group comprising pointing device input, keyboard input, and voice input.

20. The method of claim 1, where the financial product is chosen from a group comprising market baskets of financial instruments, structured products, financial indices, and mutual funds.

21. The method of claim 1, further comprising: providing, by the processor, an additional information type chosen from a group of government entities, government information, financial entities, financial information, industry information, industry segment information, sector information, index information, personal entities, and personal information that are displayed in the graphical user interface view, selected by the alteration mechanism, and related to the previously chosen information types by the indicia.

22. The method as in claim 1, further comprising: periodically importing and updating the first and second corporate entity information types from internal and external data sources.

23. The method as in claim 1, where the view type has multiple dimensions.

24. The method as in claim 1, where the first and second corporation entity information types are user created.

25. A processor-implemented method comprising:
receiving, by a processor, a first corporate entity information type that defines a first corporate entity;
receiving, by the processor, a second corporate entity information type that defines a second corporate entity;
receiving, by the processor, a corporate entity relationship information type that defines a relationship between the first and second corporate entity information types;
analyzing, by the processor, the received information types;
displaying, on a display based on the analysis, the first and second corporate entity information types and the corporate entity relationship information type in a graphical user interface view with predetermined indicia, the indicia graphically providing an indication of a connection between the first and second corporate entity information types and a strength of the relationship between the first and second corporate entity information types, where the graphical user interface view includes a first company node representing the first corporate entity and a second company node representing the second corporate entity with the first company node reflecting a size of the first corporate entity and the second company node reflecting a size of the second corporate entity;
providing, by the processor, an alteration mechanism, where:
the alteration mechanism dynamically changes an information type representing information to be displayed in the graphical user interface view;
the information type is selected from a group comprising corporate entity type, corporate entity relationship type, selection type, grouping type, arrangement type, and view type the corporate entity type is selected from a group comprising corporate entities and corporate information;
the corporate entity relationship type is selected from a group comprising buyer-seller relationships, customer-supplier relationships, company-client relationships, parent company-subsidiary relationships, ownership relationships, resource sharing relationships, joint ventures, political relationships, business relationships, competitor relationships, value chain relationships, horizontal relationships, and vertical relationships;
the selection type is selected from a group comprising stocks, bonds, financial instruments, sectors, industry segments, standard industrial classification (SIC) codes, and product lines;
the grouping type is selected from a group comprising stocks, bonds, financial instruments, sectors, industry segments, SIC codes, and product lines;
the arrangement type is selected from a group comprising column, row, grid, map, free-form, and structured; and
the view type is selected from a group comprising market information, risk information, and performance information;
dynamically analyzing, by the processor in coordination with the alteration mechanism, the received information types;
dynamically changing, by the processor based on feedback from the alteration mechanism, a displayed information type to a newly selected information type;
simultaneously displaying, on the display based on the dynamic analysis, the newly selected information type associated with the first corporate entity information type and the second corporate entity information type, each displayed in separate display panels of the graphical user interface view, where the separate display panels facilitate a comparison regarding the first and second corporate entity information types;
generating, by the processor, at least one critical path dependency pattern between the first and second corporate entity information types based on the comparison and the dynamic analysis; and
constructing, by the processor, a financial product based on the selected and displayed information types and the generated at least one critical path dependency pattern.

26. A computer system comprising:
at least one memory configured to store program code; and at least one processor configured to execute the program code to:
receive a selection of a first corporate entity information type that defines a first corporate entity;
receive a selection of a second corporate entity information type that defines a second corporate entity;
receive a selection of a corporate entity relationship information type that defines a relationship between the first and second corporate entity information types;

analyze the selected corporate entity relationship information type; provide for display, based on the analysis, the first and second corporate entity information types and the corporate entity relationship information type in a graphical user interface view with predetermined indicia, the indicia graphically providing an indication of a connection between the first and second corporate entity information types and a strength of the relationship between the first and second corporate entity information types, where the graphical user interface view includes a first company node representing the first corporate entity and a second company node representing the second corporate entity with the first company node reflecting a size of the first company and the second company node reflecting a size of the second company;

provide an alteration mechanism configured to dynamically change an information type representing information to be displayed in the graphical user interface view, where the information type is chosen from a group comprising corporate entity type, corporate entity relationship type, selection type, grouping type, arrangement type, and view type;

dynamically analyze, in coordination with the alteration mechanism, selected information types;

dynamically change, using the alteration mechanism, a displayed information type to a newly chosen information type;

provide for simultaneous display, based on the dynamic analysis, the newly chosen information type associated with the first corporate entity information type and the second corporate entity information type, each displayed in separate display panels of the graphical user interface view, where the separate display panels facilitate a comparison regarding the first and second corporate entity information types;

generate at least one critical path dependency pattern between the first and second corporate entity information types based on the comparison and the dynamic analysis; and construct a financial product based on the selected and displayed information types and the generated at least one critical path dependency pattern.

\* \* \* \* \*